(12) United States Patent
Kamimura

(10) Patent No.: US 7,569,942 B2
(45) Date of Patent: Aug. 4, 2009

(54) OUTPUT VOLTAGE CONTROLLER OF ENGINE-DRIVEN GENERATOR

(75) Inventor: Kenji Kamimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 11/819,238

(22) Filed: Jun. 26, 2007

(65) Prior Publication Data

US 2008/0042626 A1 Feb. 21, 2008

(30) Foreign Application Priority Data

| Jul. 3, 2006 | (JP) | ............................ P2006-183515 |
| Aug. 18, 2006 | (JP) | ............................ P2006-223180 |
| Aug. 21, 2006 | (JP) | ............................ P2006-224070 |

(51) Int. Cl.
| H02P 9/04 | (2006.01) |
| F01D 15/10 | (2006.01) |
| F02C 6/00 | (2006.01) |
| H02K 7/18 | (2006.01) |
| H02P 11/00 | (2006.01) |
| H02P 9/00 | (2006.01) |
| H02H 7/06 | (2006.01) |

(52) U.S. Cl. .......................... 290/40 C; 290/52; 322/25; 322/28

(58) Field of Classification Search ............... 290/40 C, 290/52; 322/25, 28
See application file for complete search history.

(56) References Cited

U.S. PATENT DOCUMENTS

| 2,012,588 | A | * | 8/1935 | Logan | .......................... 322/28 |
| 2,039,314 | A | * | 5/1936 | Harz | ............................ 322/25 |
| 2,234,104 | A | * | 3/1941 | Andrews | ...................... 322/19 |
| 2,421,645 | A | * | 6/1947 | Partington | ................... 322/28 |
| 2,569,302 | A | * | 9/1951 | Forssell | ........................ 322/25 |
| 2,682,029 | A | * | 6/1954 | Harz | ............................ 322/24 |
| 2,716,213 | A | * | 8/1955 | Neild | ........................... 322/19 |
| 3,705,331 | A | * | 12/1972 | South et al. | ................... 361/20 |
| 3,758,843 | A | * | 9/1973 | Ishizaki et al. | ................ 322/25 |
| 3,764,815 | A | * | 10/1973 | Habock et al. | ................ 290/52 |
| 3,771,045 | A | * | 11/1973 | Storz | ........................... 322/28 |

(Continued)

FOREIGN PATENT DOCUMENTS

JP 3-41038 A 2/1991

(Continued)

*Primary Examiner*—Nicholas Ponomarenko
*Assistant Examiner*—Pedro J Cuevas
(74) *Attorney, Agent, or Firm*—Arent Fox LLP

(57) ABSTRACT

A control section 32 supplies a current obtained by rectifying the output of an exciting winding 5 to a field winding 3 responding to variations in the output voltage of the generator to suppress the variations in the output voltage of the generator. The control section 32 drives a transistor 37 at a duty based on a difference between the output voltage of a main winding 4 and a target voltage and controls the gate voltage of an FET 38 to control a field current to a constant value. A flywheel power generation unit including a control power supply winding 14 is provided as a power source of the control section 32 and a power source for passing an initial current through the field winding 3. A current to be supplied to the field winding 3 from the flywheel power generation unit is merged with an exciting current via a diode 31.

17 Claims, 8 Drawing Sheets

U.S. PATENT DOCUMENTS

| | | | | |
|---|---|---|---|---|
| 3,938,028 | A * | 2/1976 | Ikeda | 322/28 |
| 4,105,963 | A * | 8/1978 | Dobranis | 322/48 |
| 4,233,555 | A * | 11/1980 | Roche | 322/25 |
| 4,591,775 | A * | 5/1986 | Nussel et al. | 318/711 |
| 4,728,879 | A * | 3/1988 | Rounce | 322/25 |
| 5,038,094 | A * | 8/1991 | Rashid | 322/28 |
| 5,136,195 | A * | 8/1992 | Allen et al. | 310/68 D |
| 5,285,147 | A * | 2/1994 | Rashid | 322/28 |
| 5,495,163 | A * | 2/1996 | Rozman et al. | 322/10 |
| 5,689,175 | A * | 11/1997 | Hanson et al. | 322/28 |
| 6,531,685 | B2 * | 3/2003 | Smith | 219/133 |
| 6,724,099 | B2 * | 4/2004 | Klaar | 290/52 |
| 6,909,262 | B2 * | 6/2005 | Yao et al. | 322/28 |
| 2001/0022511 | A1 * | 9/2001 | Adams | 322/59 |
| 2002/0139787 | A1 * | 10/2002 | Smith | 219/133 |
| 2006/0192533 | A1 * | 8/2006 | Kimura et al. | 322/22 |
| 2007/0182381 | A1 * | 8/2007 | Kamimura et al. | 322/28 |

FOREIGN PATENT DOCUMENTS

JP     5-42239 B2     6/1993

* cited by examiner

OUTPUT VOLTAGE CONTROLLER OF ENGINE-DRIVEN GENERATOR

BACKGROUND OF THE INVENTION

1. Field of the Invention

The present invention relates to an output voltage controller of an engine-driven generator and, in particular, to an output voltage controller of an engine-driven generator that keeps the output voltage of a synchronous generator stable and facilitates the control of temporarily stopping output of power generation when an excessive load is applied or restarting the generator.

Moreover, the present invention relates to an output voltage controller of an engine-driven generator capable of suppressing a self-excited action produced by the relationship between a flywheel diode and a capacitive load, which are connected in parallel to a field winding, to stabilize the output voltage of the generator.

2. Description of the Related Art

FIG. 6 is an electric wiring diagram of an automatic voltage controller which is a conventional output voltage regulator in the related art for suppressing variations in the output voltage of a generator. The automatic voltage regulator shown in FIG. 6 includes an exciting winding 101 of the generator, a field winding 103, and a detection winding 104 for detecting an output voltage. A detection circuit 109 constituted by a full-wave rectifier 105, a capacitor 106, and resistances 107, 108 rectifies the full wave of the detection output of a generator output from the detection winding 104 by a full-wave rectifying circuit 105 and inputs an output voltage Vc detected on the basis of this full-wave rectified waveform to a control circuit 102. The control circuit 102 compares the output voltage Vc with a reference voltage Vz set by a Zener diode. If Vc<V2, the control circuit 102 supplies the output current of the exciting winding 101 as a field current "if" to a field winding 103. This kind of automatic voltage regulator has widely used because the method for detecting an output voltage and the method for controlling a field current are simple. The automatic voltage regulator like this is disclosed in, for example, Japanese. Publication of examined Patent Application No. 3-41038.

A generator having this kind of automatic voltage controller is generally provided with a breaker having a mechanical contact so as to protect the generator when an excessive load is applied that is caused by the short-circuit of the output or the like. The breaker having the mechanical contact has a structure of pulling apart the contact when an excessive current is detected and has high operating reliability. Thus, the breaker has been widely used.

The automatic voltage controller disclosed in the foregoing patent document supplies a control power from the exciting winding, so the automatic voltage regulator cannot perform the control of shutting off a field current temporarily to stop generation output and then of again supplying the field current to restart generation output. This is because when the field current is turned off so as to stop generation output, the output of the exciting winding also is turned off. That is, it is difficult for the automatic voltage regulator to perform, for example, the control of temporarily stopping the generation output and providing a display showing an abnormal state or alarm when a temporary excessive current state is developed. Thus, when the excessive current is developed, the generator needs to be stopped and then to be restarted.

Moreover, to secure the field current to be supplied to the field winding at the time of restart, the construction of utilizing the remaining magnetism of a rotor itself or the construction of mounting a small magnet used for initial excitation on the rotor has been employed. However, in these constructions, the initial excitation is started at an extremely low voltage, so an FET or the like of low loss and small driving power cannot be used as a switching element for controlling a field power. Thus, a bipolar transistor of large loss needs to be used inevitably.

A current value when output is in the state of short-circuit is different depending on the impedance of a generator but usually is about two times a current value at the time of normal operation. A current of this degree may flow temporarily also at the start of an inductive load. Thus, when a breaker is set so as to be tripped immediately when the current value becomes two times the current value at the normal operation in consideration of the current value in the state of short circuit, the breaker may be tripped also when a large current flows temporarily, for example, when an inductive load is started to apply. This presents the problem of impairing usability. Moreover, when the breaker is tripped, there is brought about a state where output is shut off until the breaker is operated for recovery. Thus, it is impossible to start up the inductive load while performing the control of repeating the temporary shut off and return of the breaker.

In such automatic voltage controller, the current to be supplied to the field winding is controlled by a switching operation, and a flywheel diode connected in parallel to the field winding is generally used so as to absorb a surge developed at the time of this switching operation.

By the way, the generator employing such automatic voltage controller is used as a general power source on the site of civil engineering work and out-of-door work, and there are cases where a capacitive load having a capacitor for improving a power factor, for example, a high power factor mercury-vapor lamp is connected to the power source. When such a capacitive load is connected to the generator, an AC voltage developed in the field winding by the effect of a developed armature reaction is rectified by the flywheel diode, thereby working as an exciting current on the field winding. As a result, there are cases where an abnormal voltage beyond the control range of the automatic voltage regulator is developed to have an adverse effect on the constituent components of the circuit.

As measures against this problem, there has been proposed an automatic voltage controller in which in addition to switching elements for controlling a field current by a switching operation, there is provided with a second switching element that is connected in series to the foregoing switching element so as to be parallel to a flywheel diode and is turned on and off in opposite phases (see Japanese Publication of examined Patent Application No. 5-42239). In this automatic voltage controller, even when an AC voltage is developed and an AC current is flown in the field winding by the armature reaction, self excitation can be suppressed by flowing back the AC current as it is by the operation of the flywheel diode and the second switching element.

[Patent Document 1] Japanese Publication of examined Patent Application No. 5-42239

However, in the controller disclosed in Japanese Publication of Examined Patent Application No. 5-42239, the switching element is only disposed in a small bypass path, so there is a case where a sufficient effect cannot be obtained when a power factor is small and a developed exciting current becomes large or depending on the characteristics of the generator. Moreover, there is presented the problem that measures also need to be taken against the failure of the bypass path itself.

SUMMARY OF THE INVENTION

The present invention has been made in view of these problems.

One object of the present invention is to provide an output voltage controller of an engine-driven generator that can easily perform the control of temporarily stopping and restarting a power generation output.

Moreover, another object of the present invention is to provide an output voltage controller of an engine-driven generator that can avoid a time lag in operation as much as possible, the time lag being developed in the operation of a conventional breaker, and can prevent a breaker operation as much as possible, the breaker operation being caused by a temporary excessive current.

Furthermore, still another object of the present invention is to provide an output voltage controller of an engine-driven generator that can suitably suppress an abnormal voltage easily developed when a capacitive load is connected thereto.

The first feature of this invention is that an output voltage controller of an engine-driven generator in which a current obtained by rectifying an output of an exciting winding wound around a generator driven by an engine is supplied to a field winding responding to variations in an output voltage of the generator to suppress the variations in the output voltage, wherein a power generation unit that is disposed separately from the generator and is utilized as a power source for a regulator for controlling a quantity of current to be supplied to the field winding and a power source for passing an initial current through the field winding.

The second feature of this invention is that the separately disposed power generation unit is a flywheel power generation unit including a magnet disposed on a flywheel of the engine and an output winding disposed opposite to the magnet.

The third feature of this invention is that a current supplied to the field winding from the separately disposed power generation unit is merged via a diode with a current supplied to the field winding from the exciting winding.

The forth feature of this invention is that a field current is stopped when an output of the generator is lowered to a predetermined voltage or less when the engine revolution number is equal to a predetermined number of revolutions or more, and the current supplied to the field winding is equal to a predetermined value or more.

The fifth feature of this invention is that the output voltage controller engine-driven generator comprising return determination means for determining whether or not an output voltage of the generator is returned to a normal state in which an output voltage of the generator is a predetermined voltage or more in a state where after supply of the field current is stopped and then restarted, the number-of-revolutions determination means and the current determination means determine that a number of revolutions of the engine and a current to be supplied to the field winding are the predetermined number of revolutions and the predetermined current or more, respectively; and engine stop means for stopping the engine from revolving when the return determination means determines that the output voltage of the generator is not returned to the normal state.

The sixth feature of this invention is that quantity of current to be supplied to the field winding is controlled by a switching duty ratio of a semiconductor control element, and the quantity of current to be supplied to the field winding is determined whether more than the predetermined current or not.

The seventh feature of the present invention is an output voltage controller of an engine-driven generator including an output voltage regulation circuit in which a current obtained by rectifying an output of an exciting winding wound around a generator driven by an engine is supplied to a field winding according to variations in an output voltage of the generator; and a fly wheel diode connected in parallel to the field winding, the regulator comprising: exciting voltage determination means for determining whether or not an output voltage of the exciting winding is a predetermined voltage value or more; and current shut-off means for shutting off a current to be supplied to the field winding when a determination by the exciting voltage determination means is positive.

The eighth feature of the present invention is that the current obtained by rectifying an output of the exciting winding is supplied to the field winding by a switching operation of a switching element to have a detection signal of the output voltage of the generator fed back thereto, and the current shut-off means is constructed so as to stop the operation of the switching element to shut off the current to be supplied to the field winding.

The ninth feature of this invention is that the engine stop means is provided to stop the engine when the direct output current is more than the predetermined voltage value even after the operation of the switching element is stopped.

In a synchronous generator, there is a certain relationship between the number of revolutions of a rotor and an output frequency: for example, in the case of a two-pole synchronous generator, to produce a commercial frequency of 50 Hz or 60 Hz, the number of revolutions of an engine for driving the generator is controlled to 3000 rpm or 3600 rpm. Although a field current is changed according to a load, the field current is controlled so as not to be smaller than a predetermined current. A predetermined output voltage of the generator (for example, 100 V) is obtained on the basis of the predetermined number of revolutions and the predetermined field current.

According to the invention having a first feature, a power source for a regulator for controlling the quantity of a current to be supplied to a field winding is supplied from a power generation unit disposed separately from the generator. Thus, when an excessive load or a short circuit is developed, it is possible to respond to an excessive current by temporarily shutting off a field current to stop the output of the generator in a state where the engine is held rotated or by performing the on-off control of the field current. Moreover, when the engine is once stopped and then is restarted, an initial current is passed through the field winding from second power generation means. Thus, it is possible to secure a sufficient field current so as to restart the generator from the initial stage of restart and hence to quickly restart up the generator.

According to the invention having a second feature, the output of a flywheel power generation unit of the engine is utilized. Hence, it is possible to surely supply electric power to the regulator for controlling the quantity of a current to be supplied to the field winding while the engine is operated, and it is possible to surely supply a field current at the initial stage of start.

According to the invention having a third feature, at the initial stage of start, that is, when the output of the exciting winding is not produced, it is possible to supply a field current from the separately disposed power generation unit via a diode. At the time of the normal operation, it is possible to suppress the effect due to variations in the output on the output side of the power generation unit and to supply a sufficient field current from the exciting winding.

According to the invention having a fourth feature, when the number of revolutions of the engine is equal to a predetermined number of revolutions or more and a field current to be supplied is equal to a predetermined current or more, that is, the engine is normally operated and the generator has a sufficient field current also supplied thereto but the output voltage of the generator is reduced to a predetermined voltage or less, it is possible to determine that the generator is in the state of an excessive load. According to this determination, unlike a conventional breaker of separating a mechanical contact, it is possible to determine whether or not the generator needs to stop the power generation output accurately in a state in which there is not a time lag.

According to the invention having a fifth feature, after the generator once stops the power generation output and then the supply of a field current is restarted, it is determined whether or not the output voltage of the generator is returned to the normal state. If it is determined that the output voltage of the generator is returned to a predetermined value or more, the generator can continuously generating power as it is. Thus, the generator can be returned to the normal state immediately from an instantaneous abnormal state. Moreover, if it is determined that the output voltage of the generator is not returned to the normal state, it is possible to stop the engine and to perform maintenance such as examination of the cause of an abnormal load.

According to the invention having a sixth feature, the quantity of supply of the field current can be determined by the switching duty of the control element. Thus, it is possible to eliminate the need for providing a sensor for detecting a field current and to make a quick determination.

According to the invention having a seventh feature, the voltage of the exciting winding is detected being increased to a predetermined value or more and then the current to be supplied to the field winding from the exciting winding is shut off, so it is possible to surely prevent an abnormal voltage from being developed. Moreover, a voltage to be supplied to the field winding from the exciting winding is directly detected, so it is possible to adequately shut off the supply of current.

According to the invention having an eighth feature, by stopping the operation of the switching element, it is possible to shut off an exciting current to be supplied to the field winding from the exciting winding to extremely decrease a current flowing through the field winding in a short time.

According to the invention having a ninth feature, even if the quantity of electric charges accumulated in a load capacity is large and hence an exciting voltage is increased, because the engine is stopped, it is possible to surely stop the operation of generating power.

DETAILED DESCRIPTION OF THE PREFERRED EMBODIMENTS

Figure 1:
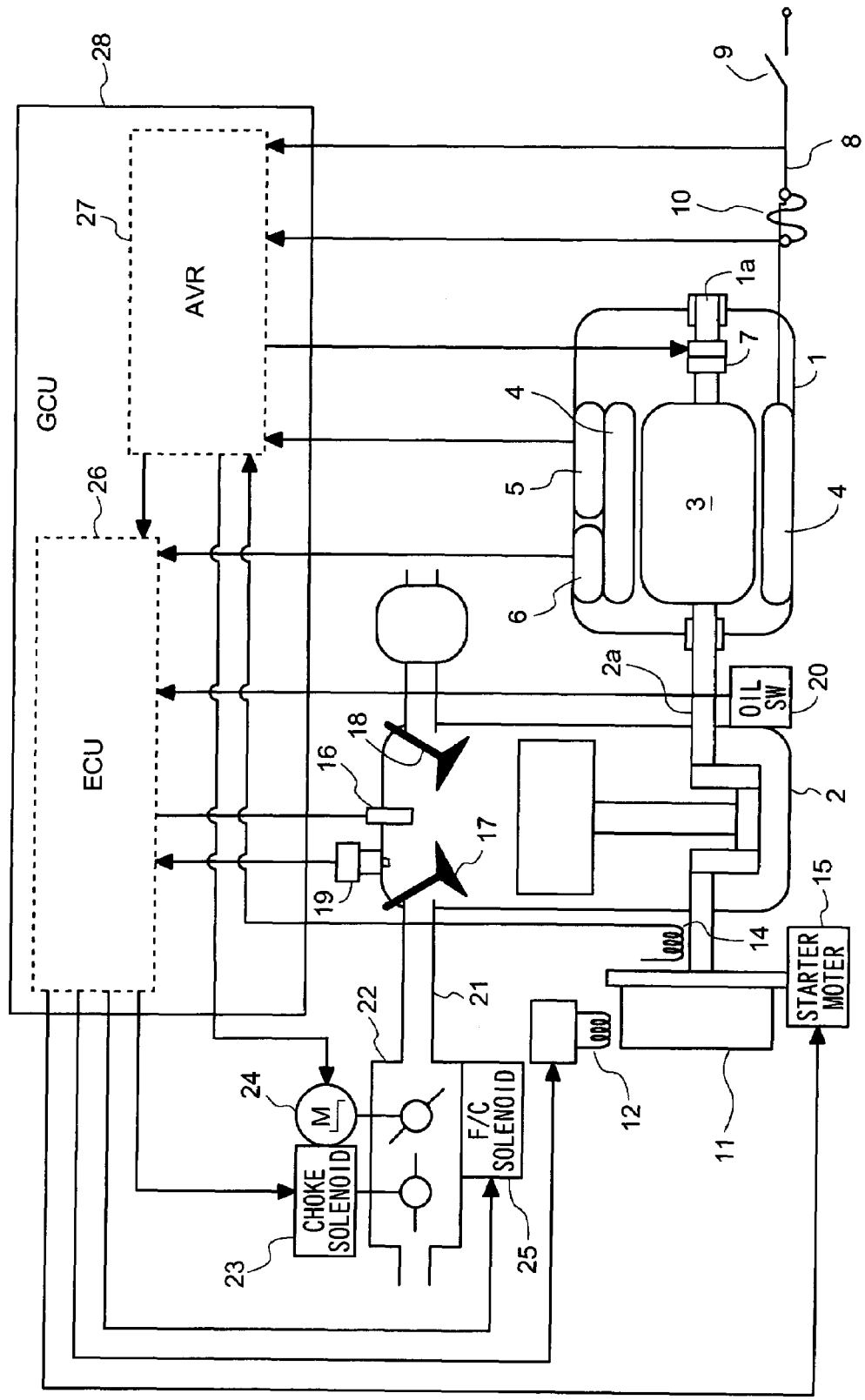
FIG. 1 is a block diagram to show the system construction of an engine-driven generator according to one embodiment of the present invention.

The present invention will be described in detail with reference to the drawings. FIG. 1 is a system construction diagram of an engine-driven generator according to one embodiment of the present invention. In FIG. 1, a rotor shaft la of a synchronous generator 1 is coupled to an output shaft 2a of an engine 2 directly or via suitable coupling means and the synchronous generator 1 is driven by the engine 2 to generate an AC output synchronous with the rotation of the engine 2. For example, a two-pole synchronous generator generates an AC output of 50 Hz at 3000 rpm and an AC output of 60 Hz at 3600 rpm.

The generator 1 includes a field winding 3 as a rotor winding, a main winding 4 as a stator winding, an exciting winding 5, and a DC winding 6, and the rotor shaft la is provided with a slip ring 7 for supplying a field current to the field winding 3.

An output wiring 8 led out from the main winding 4 is connected to an electric load (not shown) via a breaker 9. The output wiring 8 is provided with a CT sensor 10 for detecting a current passing through the electric load.

An ignition winding 12 is disposed on the outer periphery of a flywheel 11, which is closed at one end and shaped like a cylinder and connected to the output shaft 2a of the engine 2, the ignition winding 12 detecting the rotational position of the flywheel 11 and outputting an ignition signal for providing an ignition timing. On the other hand, a control power supply winding 14 is disposed inside the flywheel 11. The winding 14 is shown outside the flywheel 11 for the sake of convenience of the drawing. A magnet (not shown) is disposed opposite to the control power supply winding 14 on the inner peripheral surface of the flywheel 11 and the magnetic field of this magnet acts on the control power supply winding 14, whereby the control power supply winding 14 generates an electromotive force. A starter motor 15 for rotating the flywheel 11 at the time of rotating the engine is engaged with the outer periphery of the flywheel 11 via a gear or the like (not shown). The flywheel 11 and the magnet disposed on its inner peripheral surface and the control power supply winding 14 construct a second generator.

The cylinder head of the engine 2 is provided with an ignition plug 16, an intake valve 17, an exhaust valve 18, and a temperature sensor 19, whereas the bottom part (oil pan) of the engine 2 is provided with an oil switch 20 for detecting an oil level. An intake pipe 21 connected to the engine 2 is provided with a throttle housing 22, and the throttle housing 22 is provided with a choke solenoid 23 for controlling a choke, a throttle motor 24 for controlling opening/closing a throttle valve, and a fuel shutoff solenoid 25 for shutting off a fuel supply when the engine 2 is stopped.

The engine 2 having the foregoing construction has its operating state controlled by an engine control unit (ECU) 26 and the output voltage of the generator 1 is controlled by an automatic voltage regulator (AVR) 27. The ECU 26 and the AVR 27 construct a generator control unit (GCU) 28.

Immediately after the generator 1 is started, the control power of the AVR 27 and the initial exciting power of the field winding 3 are supplied from the control power supply winding 14. After the generator 1 is started, a field current is supplied to the field winding 3 from the exciting winding 5. The AVR 27 detects an output voltage from the electric potential of the output wiring 8 and controls the field current to be supplied to the field winding 3 in such a way that an output voltage computed on the basis of this detected voltage becomes a predetermined voltage value (for example, 100 volt). Further, the AVR 27 has not only the control of the field current but also the function of supplying a control signal to the throttle motor 24 so as to control the number of revolutions of the engine 2 and the function of shutting off or decreasing the field current when a current passing through the output wiring 8 becomes excessive. However, these functions are not directly related to the present invention, so detailed explanations of these functions will not be described.

When an excessive current state continues for a predetermined time also after the field current is decreased, the AVR 27 outputs an emergency stop signal to the ECU 26. The ECU 26 stops an ignition signal given to the ignition plug 16 in response to the emergency stop signal and drives the fuel shutoff solenoid 25 to shut off a fuel supply path to stop the engine 2. The output of the DC winding 6 is rectified and is used as the power source of the solenoid 25.

Figure 2:
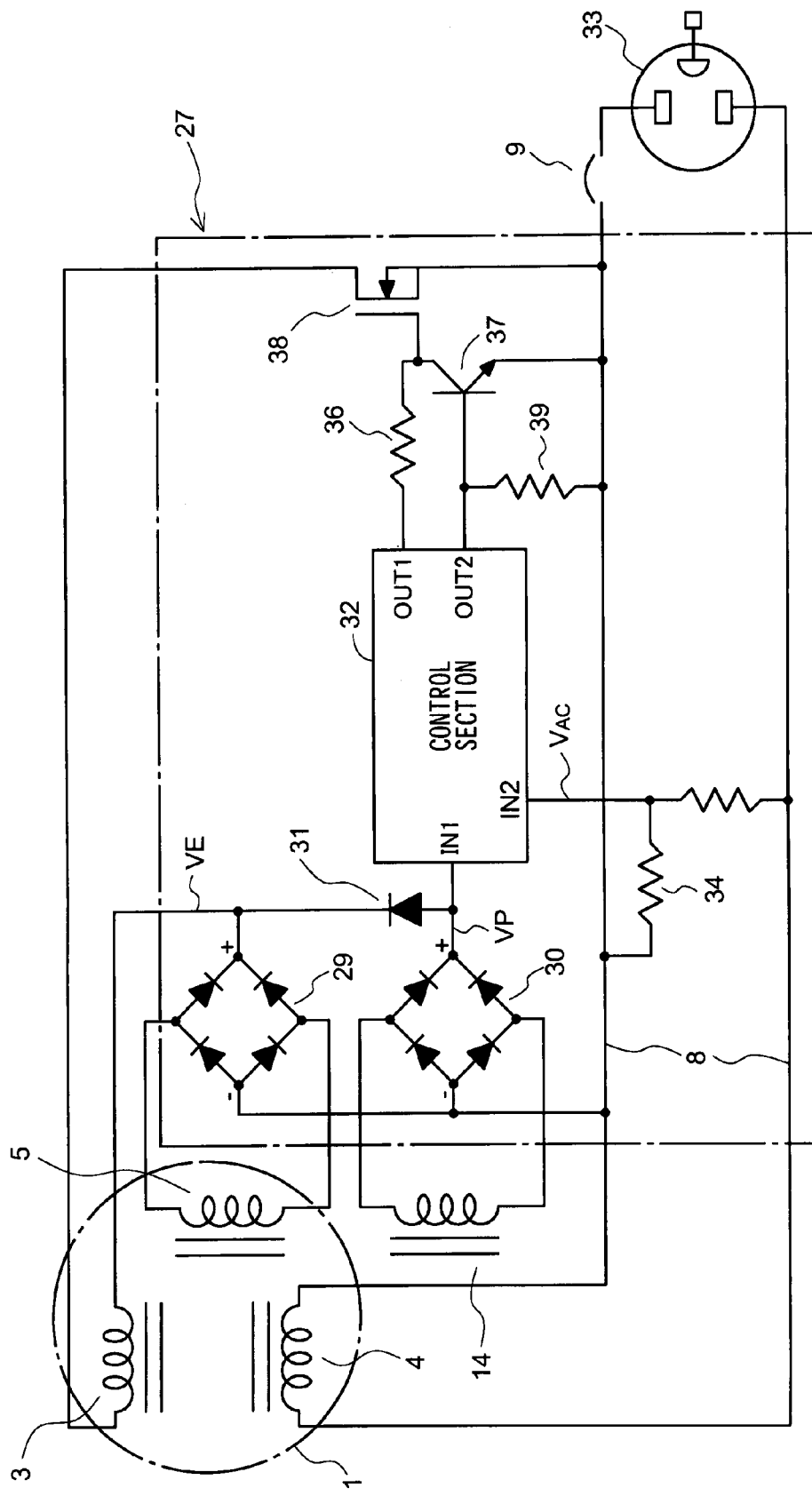
FIG. 2 is an electric wiring diagram to show one example of an AVR.

FIG. 2 is an electric wiring diagram of the AVR 27. The same reference numerals as in FIG. 1 denote the same or equivalent parts. The control power supply winding 14 and the exciting winding 5 are respectively connected to the input sides of full-wave rectifying circuits 29, 30. The output of the full-wave rectifying circuit 29 is connected to the field winding 3 via a brush (not shown) and the slip ring 7 (see FIG. 1). The output of the full-wave rectifying circuits 30 is connected to the output side of the full-wave rectifying circuit 29 via a diode 31. The output of the full-wave rectifying circuits 30 is connected to an input terminal IN1 of the control section 32 provided with a microcomputer at the cathode side of the diode 31.

The main winding 4 is connected to an AC output terminal 33. Resistances 34, 35 for detecting voltage are connected between the pair of output wirings 8 and an electric potential at the connection point, at which voltage is divided by the resistances 34, 35, is inputted as a voltage detection value VAC to an input terminal IN2 of the control section 32.

An output terminal OUT1 of the control section 32 is connected to the collector of a bipolar transistor (hereinafter, simply referred to as "transistor") and the gate of a MOSFET 38 via a resistance 36. An output terminal OUT2 of the control section 32 is connected to the base of the transistor 37. The emitter of the transistor 37 is connected to the output wiring 8. A resistance 39 is connected between the base and the emitter of the transistor 37. The drain of the MOSFET 38 is connected to the other end of the field winding 3 and the source of the MOSFET 38 is connected to the output wiring 8.

Next, the operation of the AVR 27 will be described. When starting the generator 1, first, the starter motor 15 is driven to start the engine 2. As the engine 2 is rotated, an electromotive force is developed in the control power supply winding 14 of the flywheel power generation unit 11 and this power is rectified by the full-wave rectifying circuit 30 and is supplied as the power source of the control section 32 and a part of the power source is supplied to the field winding 3 of the rotor via the diode 31.

When the power is supplied to the field winding 3, a magnetic field is developed in the field winding 3 and an electromotive force is developed in the exciting winding 5 by the magnetic field. This electromotive force is made gradually larger by positive feedback. The output voltages VE of the full-wave rectifying circuit 29 becomes larger than the output voltages VP of the full-wave rectifying circuit 30, the field current is become supplied from the exciting winding 5 and the generator 1 is excited. At the same time, an electric power generated by the control power supply winding 14 is rectified by the full-wave rectifying circuit 30 and is supplied as a control power to the control section 32.

The control section 32 detects a difference between the output voltage (effective value) VAC of the main winding 4 and a predetermined target voltage Vref and controls the field current so as to eliminate the difference to converge the output voltage VAC on the target voltage Vref.

First, the control section 32 forms a rotation period signal of the engine 2 on the basis of a signal output for one rotation of the engine 2 from the ignition winding 12. The control section 32 performs the digital sampling of the electric potential of the connection point of the resistances 34, 35, that is, the output voltage VAC for one rotation of the engine 2 and computes a waveform area to find the effective value of the output voltage VAC and increases or decreases (controls) the field current according to variations in the effective value, thereby suppressing variations in the output voltage.

In FIG. 2, the control section 32 determines the on-time ratio (duty) of the transistor 37 so as to bring the effective value of the output voltage VAC close to the target voltage Vref and PWM-controls the transistor 37 at this duty. In response to the operation of the transistor 37, the gate voltage of the MOSFET 38 is controlled and a current supplied to the field winding 3 from the exciting winding 5 is controlled.

For example, when a load current increases and the output voltage VAC of the output winding 4 decreases, the effective value of the detected output voltage VAC decreases. Then, the duty of the transistor 37 is increased so as to bring the effective value close to the target voltage Vref to increase a current passing though the MOSFET 38. As a result, the field current increases and the output voltage VAC increases, whereby a decrease in the output voltage caused by the increase in the load current can be corrected.

On the contrary, when the load becomes light and the output voltage VAC of the output winding 4 increases, the effective value of the detected output voltage VAC increases and hence the duty of the transistor 37 is decreased so as to bring the effective value close to the target voltage Vref to decrease the current passing through the MOSFET 38. As a result, the field current decreases and the output voltage VAC decreases, whereby an increase in the output voltage caused by the light load can be corrected.

Figure 5:
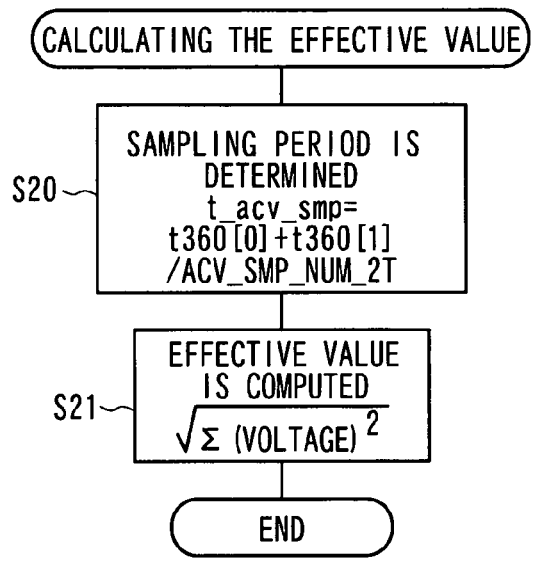
FIG. 5 is a flow chart to compute an effective value of an output voltage.
Figure 6:
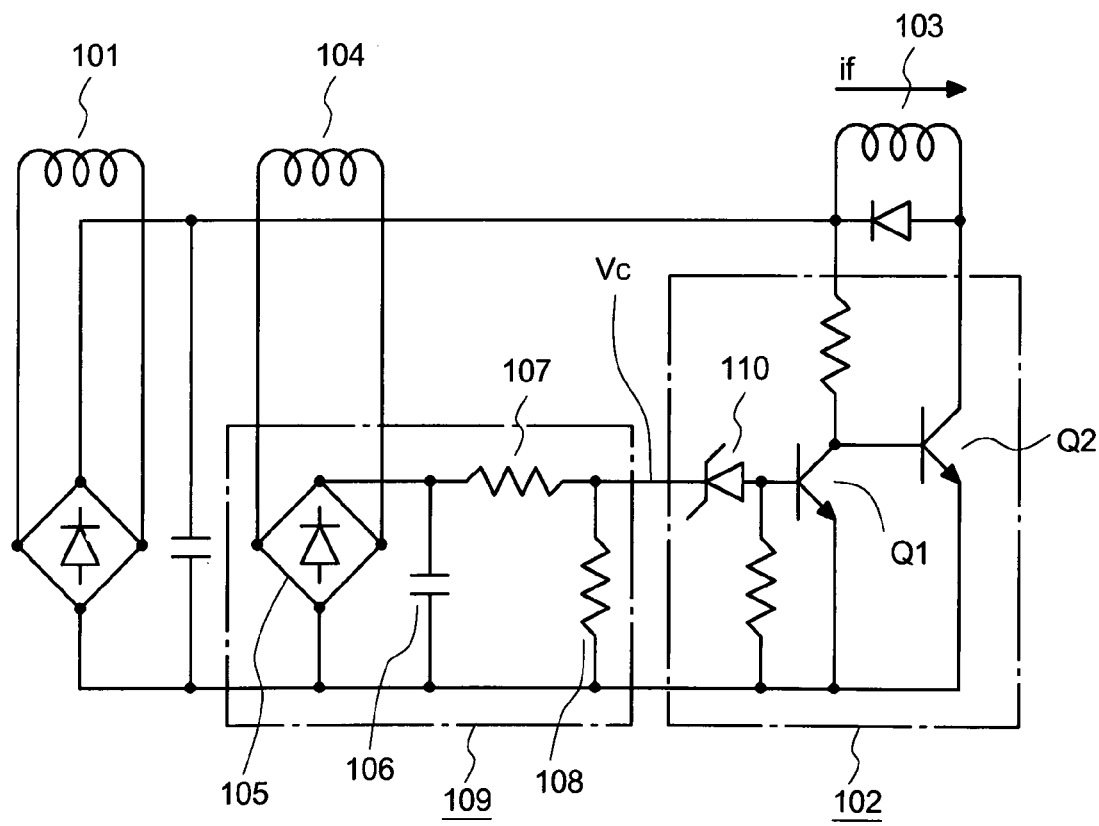
FIG. 6 is an electric wiring diagram to show one example of an AVR according to a conventional art.

Next, the procedure of computing the effective value will be described with reference to a flow chart shown in FIG. 5. In FIG. 5, in step S20, the sampling period of the output voltage is determined. The sampling period t_acv_smp is computed as a value obtained by dividing two most recent engine rotation periods t360 [0]+t360 [1] by a set value ACV_SMP_NUM_2T (for example, "100").

In step S21, an effective value is computed. The effective value is computed by integrating a value, which is obtained by squaring the instantaneous value of the output voltage, over one period and then by finding the square root of the value. By integrating the value obtained by squaring the instantaneous value of the output voltage, data expressing an output waveform can be obtained.

The effective value computed in this manner is used as a detected voltage and a feedback quantity, that is, the duty for the PWM control is computed by the use of the following equations (1) and (2), Feedback quantity=fundamental duty+(target voltage−detected voltage)+integral term Ti  (Equation 1)

Integra term Ti=Ti+(target voltage−detected voltage)× coefficient Ki  (Equation 2)

where the fundamental duty is a fixed value that is previously set.

When the load current temporarily becomes excessive while the generator 1 is operated, it is desirable that the field current is reduced nearly to zero to bring the output once into a stop state (that is, to bring also the output of the exciting winding nearly to zero) to protect the generator 1. In this embodiment, even if the output of the generator 1 is once stopped, as described above, the control section 32 of the AVR 27 has power supplied thereto from the control power supply winding 14 of the output winding of the flywheel power generation unit provided in the engine 1 separately from the generator 1. Thus, the operation of stopping or restarting the field current urgently by the power supplied from the control power supply winding 14 can be easily performed. Therefore, it is possible to provide a safe engine-driven generator with excellent usability.

Moreover, because a sufficient field current can be secured from the beginning of the startup, the generator 1 can quickly start up and can stably develop the output power. Thus, by setting the MOSFET 38 in such a way as to become on when the output voltage of the control power supply winding 14 becomes sufficiently larger than a gate threshold voltage, a MOSFET of low loss can be also used.

Figure 3:
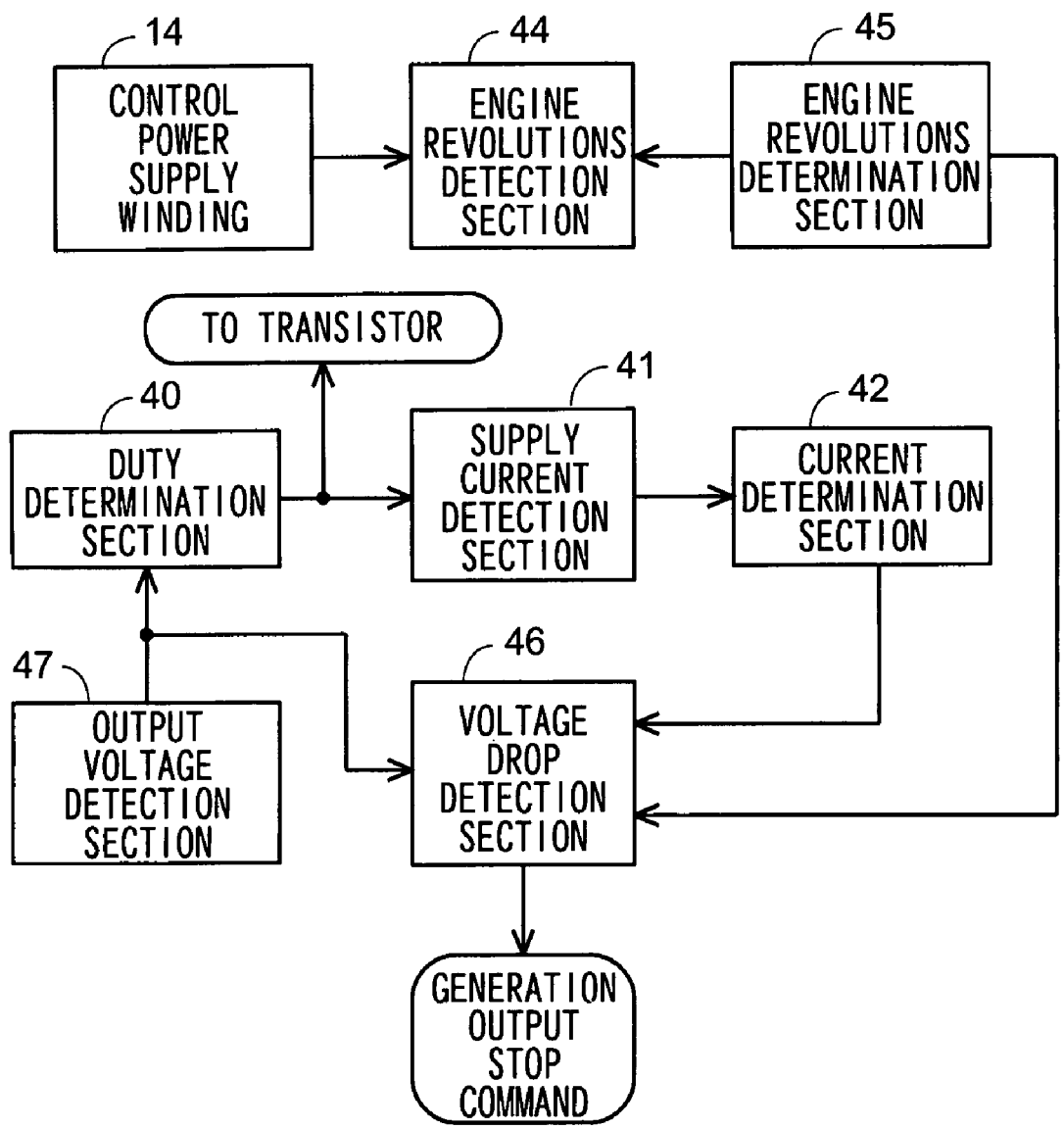
FIG. 3 is a block diagram to show a main function of a control section.

The control section 32 can have the function that shuts off supply of the field current to the field winding 3 to stop the generator 1 from generating power when the output of the generator 1 is brought into the state of an excessive load such as short circuit. In the case where the control section 32 has this function, the breaker 9 shown in FIG. 1 can be omitted. FIG. 3 is a block diagram to show the main function of the control section 32. In FIG. 3, a duty determination section 40 determines the duty of a pulse signal for driving the transistor 37. The duty of this pulse signal is determined in such a way that as (reference voltage Vref−output voltage Vac) becomes larger, the duty becomes larger, that is, the time during which the transistor 37 is in the on state becomes longer. A supply current detection section 41 detects the duty output from the duty determination section 40 and supplies the duty to a current determination section 42. The current determination section 42 determines the value of current supplied to the field winding 3 on the basis of the input duty. When the current value supplied to the field winding 3 is a predetermined reference duty or more, the current determination section 42 outputs a positive signal.

An engine number-of-revolutions detection section 44 detects the number of revolutions of the engine 2 on the basis of the output frequency of the control power supply winding 14. When the detected number of revolutions of the engine 2 is a predetermined number of revolutions or more, the number-of-revolutions determination section 45 outputs a positive signal. When a voltage drop determination section 46 has positive signals input thereto from both of the current determination section 42 and the number-of-revolutions determination section 45, the voltage drop detection section 46 determines that the generator 1 normally generates power. Then, the voltage drop determination section 46 reads the output voltage Vac from an output voltage detection section 47 and compares the read output voltage with a predetermined voltage Vsac to determine a short circuit. When the output voltage Vac is lower than the predetermined voltage Vsac, the voltage drop determination section 46 outputs a generation output stop command. The duty determination section 40 outputs duty [0] by the generation output stop command to bring the field current to zero, thereby stopping power generation.

In other words, when the engine 2 is operated over the predetermined number of revolutions (3000 rpm) required to produce a predetermined frequency (for example, 50 Hz) and the field current is also supplied over a predetermined duty (for example, 90%) but the output voltage Vac does not reach the predetermined voltage Vsac, power generation is immediately stopped.

Figure 4:
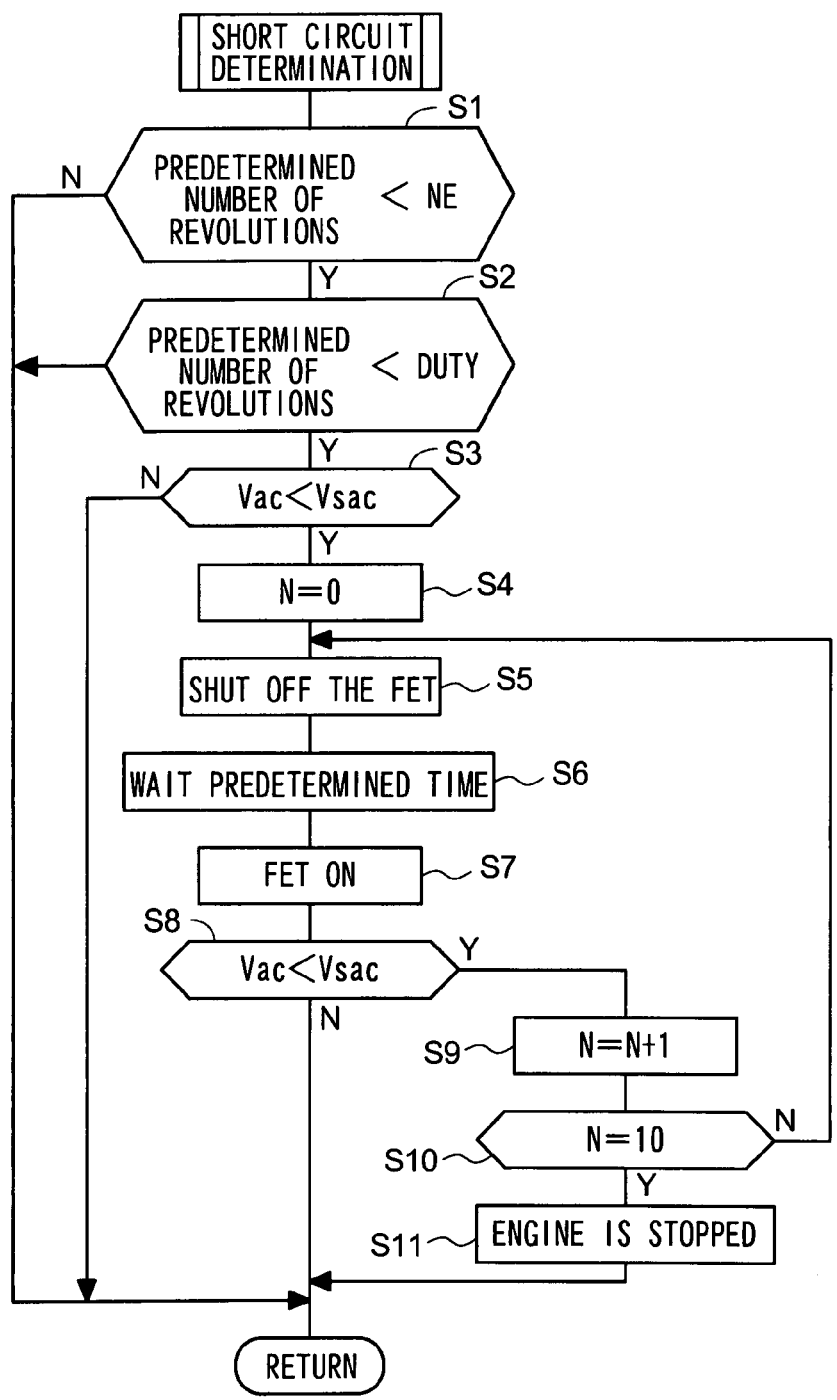
FIG. 4 is a flow chart to show a main processing of the control section.

The foregoing operation at the time of output short-circuit will be described with reference to a flow chart. FIG. 4 is a flow chart of a short-circuit determination. The processing of the short-circuit determination is started in the processing of the main routine, for example, by a timer interrupt. In step S1, it is determined by the function of the number-of-revolutions determination section 45 whether or not the number of revolutions NE of the engine is a predetermined number of revolutions or more. If the number of revolutions NE of the engine 2 is the predetermined number of revolutions or more, the routine proceeds to step S2. In step S2, it is determined by the function of the current determination section 42 whether or not the duty of the pulse signal output from the duty determination section 40 is a predetermined duty or more. If the duty is the predetermined duty or more, the routine proceeds to step S3.

In step S3, it is determined by the function of the voltage drop determination section 46 whether or not the output voltage Vac of the generator 1 is the predetermined voltage Vsac or less. If the output voltage Vac is the predetermined voltage Vsac or less, the routine proceeds to step S4 where a counter value N is reset to zero. When all determinations in steps S1 to S3 are affirmative, that is, it is determined that a short circuit is developed, then, the processing of determining whether or not a short-circuited state is released (short-circuit release determination) is started. The counter value N is provided to represent the number of determinations of the short-circuit release determination.

In step S5, by the determination in step S3 that the short circuit is developed, the duty to drive the transistor 37 is reduced to zero to shut off the MOSFET 38 to stop generating power. In step S6, the timer is started and it is determined whether or not a time previously set for the short-circuit release determination passes. When the expected time passes, in step S7, the MOSFET 38 is driven and in step S8, it is determined whether or not the output voltage Vac is the predetermined voltage Vsac or less. If the determination in step S8 is affirmative, the routine proceeds to step S9 where the counter value N is incremented by one.

In step S10, it is determined whether or not the counter value N reaches a predetermined number of times (here, [10]). If the output voltage Vac is left the predetermined voltage Vsac or less even if the short-circuit release determination is made the predetermined number of times, it is determined that there is brought about the state in which the short circuit is not temporary but cannot be released if nothing is done. Then, if the determination in step S10 is affirmative, the routine proceeds to step S11 where the operation of the engine 2 is stopped. Until the short-circuit release determination is made the predetermined number of times, the routine proceeds from step S10 to step S5 to make the short-circuit release determination again. If the determinations in step S1 to S3 and S8 are negative, it is determined that short circuit is not developed and the routine passes this flow chart and returns to the main routine.

This embodiment can provide an engine-driven generator that can sufficiently secure a breaker function and is excellent in usability. There has been shown an example in which the number of revolutions of the engine, the duty, and the threshold value of the output voltage of the generator for an excessive load determination are assumed to be 3000 rpm, 90%, and 50 V, respectively. However, these values are only examples and can be freely set according to a predetermined output frequency and a predetermined output voltage to be developed by the generator 1. The determination of supplying current to the field winding is not necessarily made on the basis of the switching duty of the control element but may be made on the basis of the detection current of a current detector disposed on a line for supplying current to the field winding.

In this embodiment, electric power is supplied as the operating power source of the control section 32 of the AVR 27 from the control power supply winding 14 of the output winding of the flywheel power generation unit disposed in the engine 2 separately from the generator 1. Thus, it is possible to provide an engine-driven generator that can easily perform the foregoing protecting operation of stopping the field current urgently by the power from the control power supply winding 14 and is excellent in usability.

Figure 7:
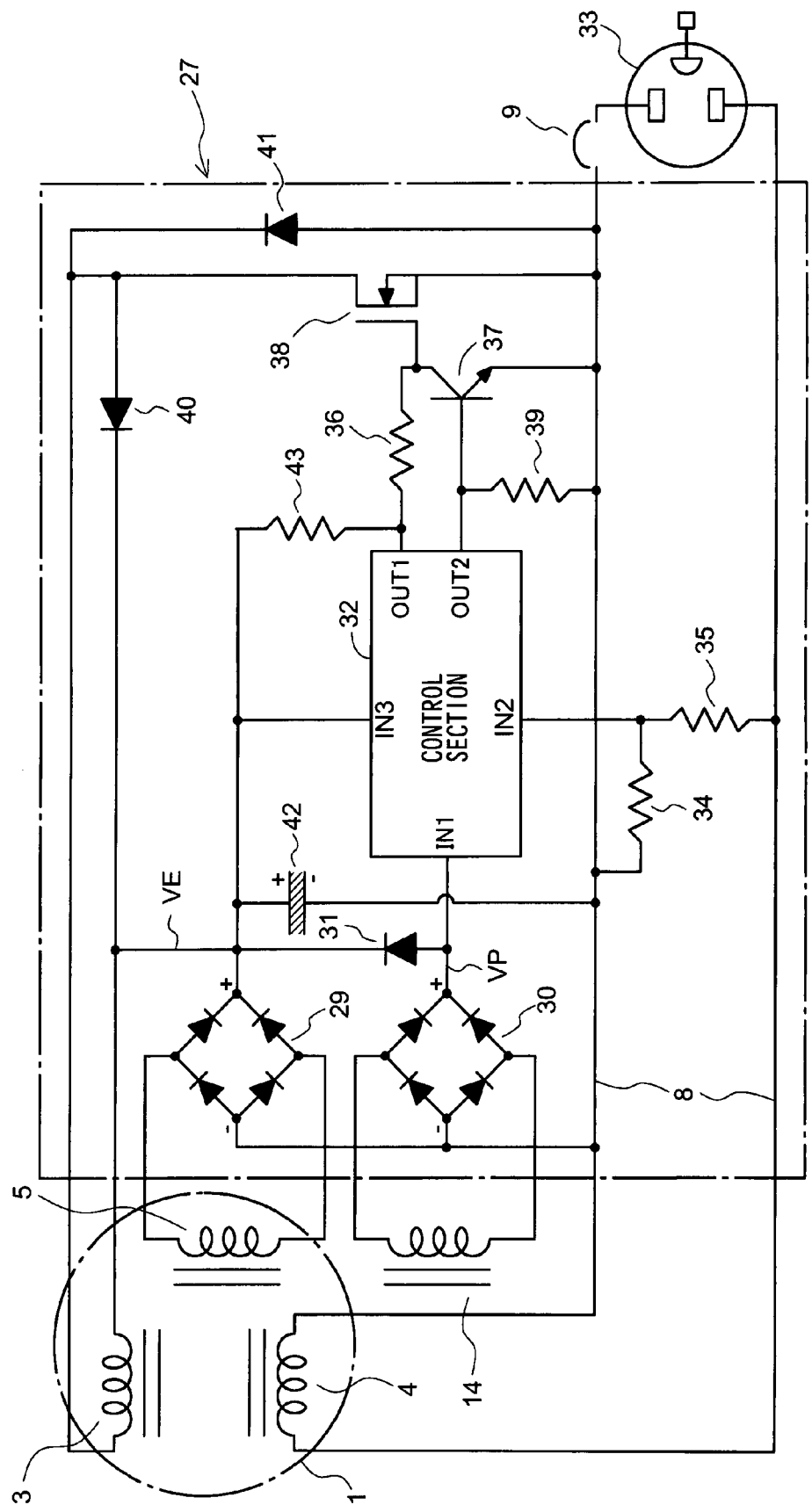
FIG. 7 is an electric wiring diagram according to a second embodiment of an AVR.

FIG. 7 is an electric wiring diagram according to a second embodiment of the AVR 27. The same reference numerals in FIG. 2 denote the same or equivalent parts.

The drain of the MOSFET 38 is connected to the other end of the field winding 3 via the flywheel diode 40 and the source is connected to the output wiring 8. A flywheel diode 41 for absorbing surge voltage is connected in parallel to the field winding 3, that is, between the source and drain of the MOSFET 38.

The output of the full-wave rectifying circuit 29 is connected to the input terminal IN3 of the control section 32 and a capacitor 42 for smoothing an input to the input terminal IN3 is connected between the output terminals of the full-wave rectifying circuit 29, and a resistance 43 is connected between the positive side of the capacitor 42 and the output terminal OUT1.

Figure 8:
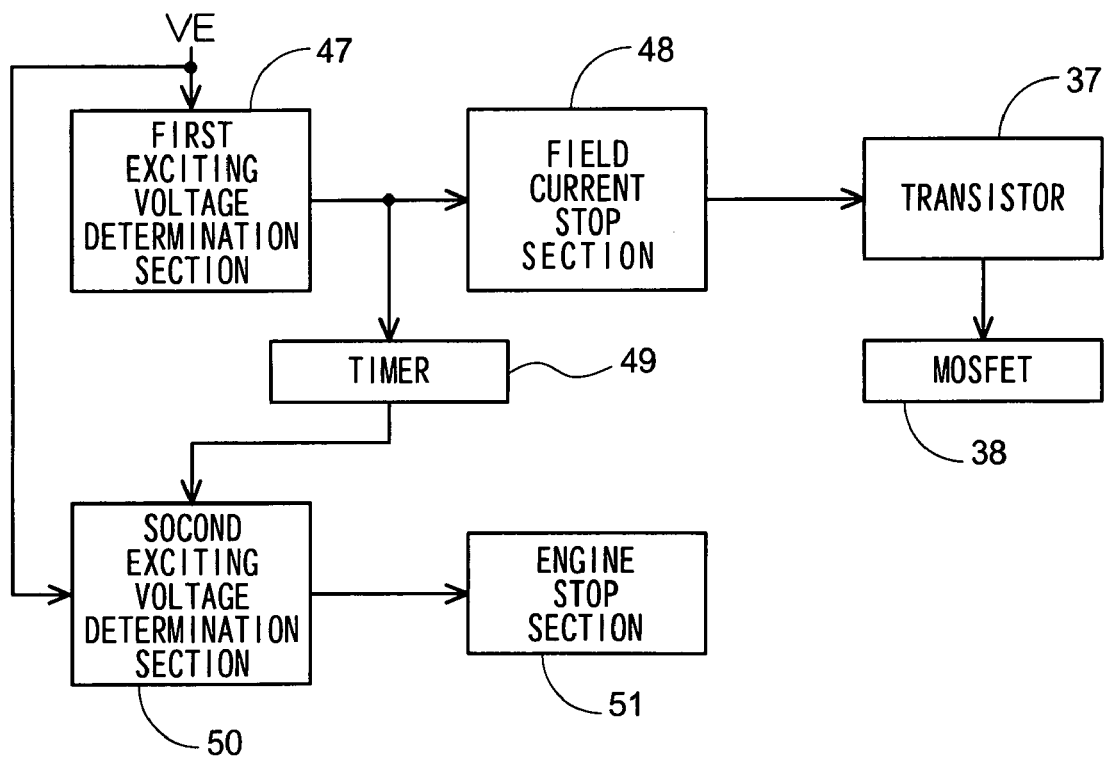
FIG. 8 is a block diagram to show a main function of a control section.

The AVR 27 shown in FIG. 7 performs the same operation as the AVR shown in FIG. 2 and further the control section 32 has the function of stopping generation output when an excessive voltage is developed in the exciting winding 5. FIG. 8 is a block diagram to show the main function of the control section 32. In FIG. 8, a first exciting voltage determination section (exciting voltage determination means) 47 compares a voltage VE, which is developed in the exciting winding 5 and is rectified by the full-wave rectifying circuit 29, with a reference voltage VE1 previously set for an excessive voltage determination. Then, if VE>VE1, the first exciting voltage determination section 47 inputs a positive determination signal to a field current stop section 48. The field current stop section 48 brings the duty of the transistor 37 to zero in response to the positive determination signal to shut off the MOSFET 38, thereby stopping supplying current to the field winding 3.

The positive determination signal from the first exciting voltage determination section 47 is input also to a timer 49. When the timer 49 has the positive determination signal input thereto, the timer 49 starts. When the timer 49 times out after a set time elapses, a second exciting voltage determination section 50 is urged in response to this time out to compare the voltage VE with the reference voltage VE1. If the relationship of VE>VE1 still remain unchanged, a second positive determination signal is input to an engine stop section 51. The engine stop section 51 stops the engine 2 in response to the second positive determination signal. The engine stop section 51 stops supplying the ignition signal and the fuel to the engine 2 to stop the engine 2.

In this example, the determination reference voltage of the first exciting voltage determination section 47 and the determination reference voltage of the second exciting voltage determination 50 are set for the same value VE1, and if the voltage developed in the exciting winding 5 does not become smaller than the reference voltage VE1 even if a predetermined time passes after power generation is stopped, the engine 2 is stopped. However, the condition for stopping the engine 2 is not necessarily limited this, but the determination reference voltage of the second exciting voltage determination section 50 may be set higher than the determination reference voltage of the first exciting voltage determination section 47. In this case, even if power generation is stopped, it can be determined whether or not the voltage developed by the exciting winding 5 is increased. When the voltage developed by the exciting winding 5 is larger than the reference voltage, the engine 2 is stopped.

Figure 9:
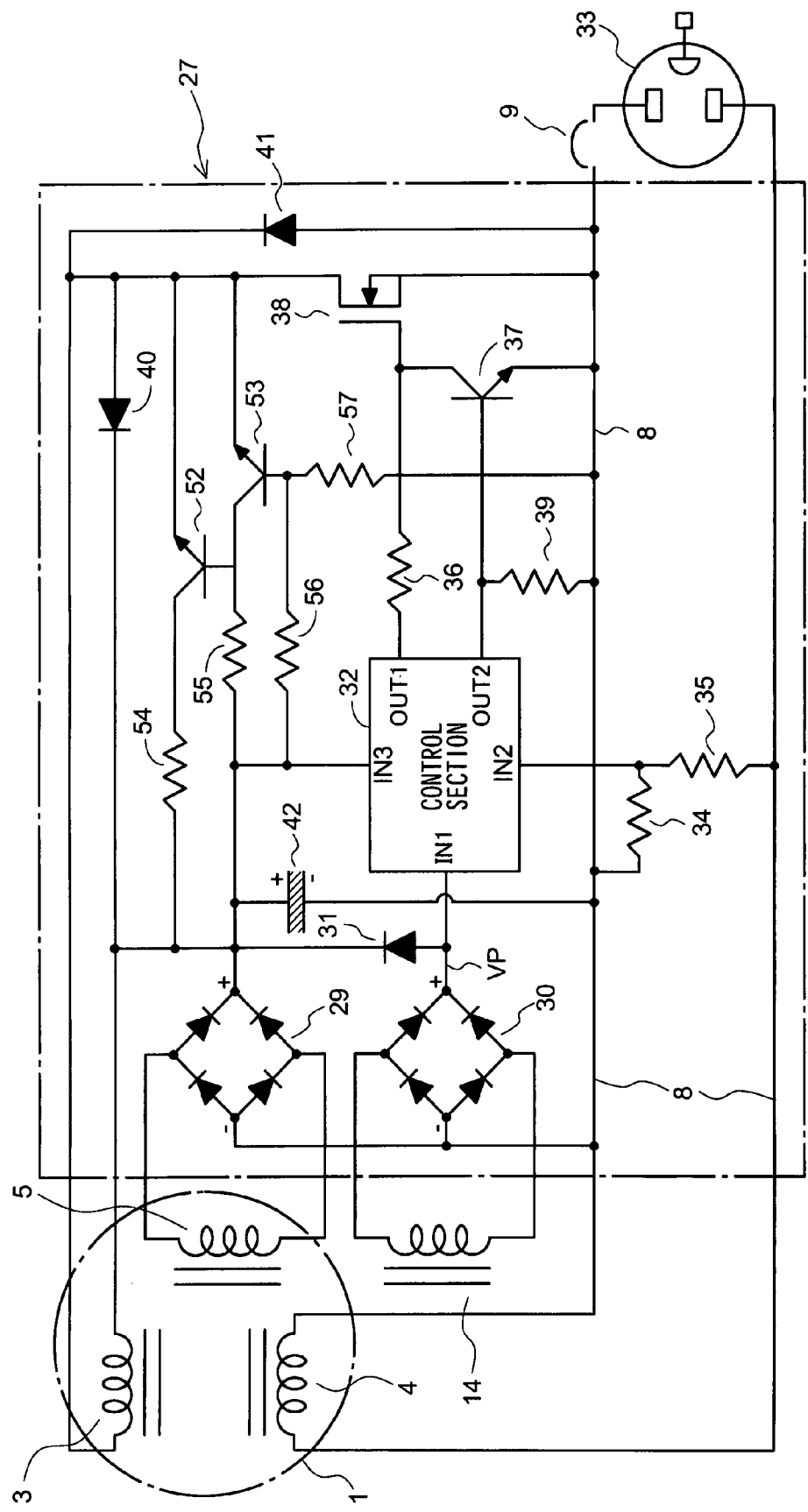
FIG. 9 is an electric wiring diagram according to a third embodiment of an AVR.

FIG. 9 is an electric wiring diagram of the AVR according to a third embodiment of the present invention. The same reference numerals as in FIG. 2 and FIG. 7 denote the same or equivalent parts in FIG. 2 and FIG. 7. In FIG. 9, a second transistor 52 and a third transistor 53 are disposed in parallel between the field winding 3 and the MOSFET 38. The collectors of the second transistor 52 and the third transistor 53 are connected respectively to the output sides of the field winding 3 and the full-wave rectifying circuit 29 via resistances 54, 55. The bases of the second transistor 52 and the third transistor 53 are connected respectively to the output sides of the field winding 3 and the full-wave rectifying circuit 29 via the resistances 55, 56. The base of the second transistor 52 is connected to the collector of the third transistor 53. The emitters of the second transistor 52 and the third transistor 53 are connected to the drain of the MOSFET 38. The base of the third transistor 53 is connected to the output wiring 8 via a resistance 57.

The second transistor 52 and the third transistor 53 connected in this manner operate so as to be on (to be brought to a state in which the transistors can be on) in opposite phases.

In the output voltage control circuit shown in FIG. 9, when the MOSFET 38 becomes on, the emitter potential of the third transistor 53 is lowered. Then, the third transistor 53 becomes on and the second transistor 52 becomes off. On the other hand, when the MOSFET 38 becomes off, the emitter potential of the third transistor 53 becomes high and the third transistor 53 becomes off. Then, the second transistor 52 becomes on (is brought to a state where the second transistor 52 can be on). When voltage is developed in the field winding 3 in a state where the second transistor 52 can be on, the second transistor 52 becomes on.

For example, when a capacitive load is connected, if the output voltage VP is increased by a magnetism increasing action by an armature reaction, the driving duty of the transistor 37 is reduced to zero to be brought to the off state, whereby the MOSFET 38 does not flow current. At this time, the third transistor 53 becomes off and the second transistor 52 is brought to a state where the second transistor 52 can be on. The second transistor 52 flows back current developed in one half cycle of an AC voltage excited by the field winding 3 and flows back current developed in the other half cycle in a direction opposite to the foregoing direction via the diode 40. Thus, the magnetism increasing action by the armature reaction can be suppressed.

According to the control section 32 of the embodiment shown in this FIG. 9, it is possible to prevent a high voltage from being applied to the MOSFET 38. Further, when the voltage VE developed by the exciting winding 5 is excessively large as compared with the reference voltage, it is possible to exert the action of protecting the circuit by bringing the transistor 37 to the off state to shut off the current flowing through the MOSFET 38 or by stopping the engine 2.

According to the foregoing construction, it is possible to suppress an excessively large voltage from being developed in the exciting winding. Moreover, according to this embodiment, the electric power is supplied as the operating power source of the control section 32 of the AVR 27 from the control power supply winding 14 of the output winding of flywheel power generation unit disposed in the engine 1 separately from the generator 1. Hence, it is possible to easily perform the foregoing protecting operation of stopping the field current urgently or stopping the engine by the electric power from the control power supply winding 14. Therefore, it is possible to provide the engine-driven generator of excellent usability.

What is claimed is:

1. An output voltage controller of an engine-driven generator in which a current obtained by rectifying an output of an exciting winding wound around a generator driven by an engine is supplied to a field winding responding to variations in an output voltage of the generator to suppress the variations in the output voltage, wherein a power generation unit that is disposed separately from the generator and is utilized as a power source for a regulator for controlling a quantity of current to be supplied to the field winding and a power source for passing an initial current through the field winding.

2. The output voltage controller of an engine-driven generator according to claim 1, wherein the separately disposed power generation unit is a flywheel power generation unit including a magnet disposed on a flywheel of the engine and an output winding disposed opposite to the magnet.

3. The output voltage controller of an engine-driven generator according to claim 1 or 2, wherein a current supplied to the field winding from the separately disposed power generation unit is merged via a diode with a current supplied to the field winding from the exciting winding.

4. An output voltage controller of an engine-driven generator in which a current obtained by rectifying an output of an exciting winding wound around a generator driven by an engine is supplied to a field winding responding to variations in an output voltage of the generator to suppress the variations in the output voltage, the controller comprising:

number-of-revolutions determination means for determining whether or not a number of revolutions of the engine is a predetermined number of revolutions or more;

current determination means for determining whether or not a current to be supplied to the field winding is a predetermined current or more;

voltage determination means for determining whether or not an output voltage of the generator is lowered to a predetermined voltage or less when both of determinations of the current determination means and the voltage determination means are positive; and field current supply stop means for stopping supplying the field current when a determination by the voltage determination means is positive.

5. The output voltage controller of an engine-driven generator according to claim 4, comprising:

return determination means for determining whether or not an output voltage of the generator is returned to a normal state in which an output voltage of the generator is a predetermined voltage or more in a state where after supply of the field current is stopped and then restarted, the number-of-revolutions determination means and the current determination means determine that a number of revolutions of the engine and a current to be supplied to the field winding are the predetermined number of revolutions and the predetermined current or more, respectively; and engine stop means for stopping the engine from revolving when the return determination means determines that the output voltage of the generator is not returned to the normal state.

6. The output voltage controller of an engine-driven generator according to claim 4 or 5, wherein a power generation unit disposed separately from the generator is utilized as a power source for a regulator for controlling a quantity of current to be supplied to the field winding and a power source for passing an initial current through the field winding.

7. The output voltage controller of an engine-driven generator according to claim 6, wherein the separately disposed power generation unit is a flywheel power generation unit including a magnet disposed on a flywheel of the engine and an output winding disposed opposite to the magnet.

8. The output voltage controller of an engine-driven generator according to claim 6, wherein a current supplied to the field winding from the separately disposed power generation unit is merged via a diode with a current supplied to the field winding from the exciting winding.

9. The output voltage controller of an engine-driven generator according to claim 7, wherein a current supplied to the field winding from the separately disposed power generation unit is merged via a diode with a current supplied to the field winding from the exciting winding.

10. The output voltage controller of an engine-driven generator according to any one of claim 4 or 5, wherein the quantity of current to be supplied to the field winding is controlled by a switching duty ratio of a semiconductor control element, and the current determination means determines whether or not the quantity of current to be supplied to the field winding is the predetermined current or more by the duty ratio.

11. The output voltage controller of an engine-driven generator according to claim 7, wherein the quantity of current to be supplied to the field winding is controlled by a switching duty ratio of a semiconductor control element, and the current determination means determines whether or not the quantity of current to be supplied to the field winding is the predetermined current or more by the duty ratio.

12. The output voltage controller of an engine-driven generator according to claim 8, wherein the quantity of current to be supplied to the field winding is controlled by a switching duty ratio of a semiconductor control element, and the current determination means determines whether or not the quantity of current to be supplied to the field winding is the predetermined current or more by the duty ratio.

13. The output voltage controller of an engine-driven generator according to claim 9, wherein the quantity of current to be supplied to the field winding is controlled by a switching duty ratio of a semiconductor control element, and the current determination means determines whether or not the quantity of current to be supplied to the field winding is the predetermined current or more by the duty ratio.

14. An output voltage controller of an engine-driven generator including an output voltage regulation circuit in which a current obtained by rectifying an output of an exciting winding wound around a generator driven by an engine is supplied to a field winding according to variations in an output voltage of the generator; and a fly wheel diode connected in parallel to the field winding, the controller comprising:

exciting voltage determination means for determining whether or not an output voltage of the exciting winding is a predetermined voltage value or more; and current shut-off means for shutting off a current to be supplied to the field winding when a determination by the exciting voltage determination means is positive.

15. The output voltage controller of an engine-driven generator according to claim 14, wherein a current obtained by rectifying an output of the exciting winding is supplied to the field winding by a switching operation of a switching element to have a detection signal of the output voltage of the generator fed back thereto, and the current shut-off means is constructed so as to stop the operation of the switching element to shut off the current to be supplied to the field winding.

16. The output voltage controller of an engine-driven generator according to claim 15, comprising:

re-determination instruction means for urging the exciting voltage determination means after the operation of the switching element is stopped and then a predetermined time passes; and engine stop means for stopping the engine when a determination made by the exciting voltage determination means by an instruction of the re-determination instruction means is positive.

17. The output voltage controller of an engine-driven generator according to any one of claims 14 to 16, wherein a power generation unit disposed separately from the generator is utilized as a power source for a regulator for controlling a quantity of current to be supplied to the field winding and a power source for passing an initial current through the field winding.

\* \* \* \* \*